(12) United States Patent
Sakamoto et al.

(10) Patent No.: US 7,769,008 B2
(45) Date of Patent: Aug. 3, 2010

(54) MULTICAST PACKET ROUTING ARRANGEMENTS FOR GROUP-MEMBERSHIP HANDLING

(75) Inventors: Yoshitaka Sakamoto, Yokohama (JP); Hisao Taguchi, Yokohama (JP); Migaku Ota, Yokohama (JP); Shinsuke Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 790 days.

(21) Appl. No.: 11/155,723

(22) Filed: Jun. 20, 2005

(65) Prior Publication Data
US 2005/0281265 A1 Dec. 22, 2005

(30) Foreign Application Priority Data
Jun. 21, 2004 (JP) ............................. 2004-181988

(51) Int. Cl.
H04L 12/28 (2006.01)
(52) U.S. Cl. ................... 370/390; 370/312; 709/238
(58) Field of Classification Search ................ 370/312, 370/352, 389, 397, 401, 342, 390; 713/161; 709/238
See application file for complete search history.

(56) References Cited

U.S. PATENT DOCUMENTS

| 5,550,816 | A  | * | 8/1996  | Hardwick et al. ........... 370/397 |
| 5,959,989 | A  | * | 9/1999  | Gleeson et al. ............. 370/390 |
| 6,539,022 | B1 | * | 3/2003  | Virgile ....................... 370/401 |
| 6,611,872 | B1 | * | 8/2003  | McCanne .................... 709/238 |
| 6,654,371 | B1 | * | 11/2003 | Dunstan et al. ............. 370/390 |
| 6,795,433 | B1 | * | 9/2004  | Li ............................... 370/389 |
| 6,856,621 | B1 | * | 2/2005  | Artes .......................... 370/390 |
| 7,080,153 | B2 | * | 7/2006  | Monteiro et al. ........... 709/231 |
| 7,236,465 | B2 | * | 6/2007  | Banerjee et al. ............ 370/312 |
| 7,266,686 | B1 | * | 9/2007  | Monteiro et al. ........... 713/161 |
| 7,327,719 | B2 | * | 2/2008  | Hardisty ..................... 370/352 |

(Continued)

FOREIGN PATENT DOCUMENTS

JP  2003-143212  5/2003

OTHER PUBLICATIONS

"Internet Group Management Protocol, Version 2", Network Working Group, Request for Comments: 2236, pp. 1-18, Nov. 1997.

(Continued)

Primary Examiner—William Trost, IV
Assistant Examiner—Emmanuel Maglo
(74) Attorney, Agent, or Firm—Antonelli, Terry, Stout & Kraus, LLP.

(57) ABSTRACT

A packet routing arrangement, when receiving a request to join or leave a multicast group from a host unregistered to that group, a response is sent exclusively to the unregistered host. In the packet routing arrangement, when receiving a request packet from a host to join or leave a group, including the identifier of the group, it is determined whether the source host of the packet is registered to that group; and, if it is not registered, the first group identifier is changed to a second group identifier assigned to another delivery server delivering information to the other unregistered host and the packet is transferred to this other delivery server. When receiving a packet containing certain information from this delivery server, the second group identifier included in the received packet is changed to the first group identifier and the packet is transmitted to the unregistered host.

12 Claims, 9 Drawing Sheets

U.S. PATENT DOCUMENTS

| | | | |
|---|---|---|---|
| 7,327,730 B2 * | 2/2008 | Chen et al. .................. | 370/390 |
| 2003/0081595 A1 | 5/2003 | Nomura et al. | |
| 2003/0142672 A1 * | 7/2003 | Chen et al. .................. | 370/390 |
| 2005/0007969 A1 * | 1/2005 | Hundscheidt et al. ....... | 370/312 |
| 2005/0111474 A1 * | 5/2005 | Kobayashi .................. | 370/432 |

OTHER PUBLICATIONS

"Host Extensions for IP Multicasting", Network Working Group, Request for Comments: 1112, pp. 1-13, Aug. 1989.

"Multicast Listener Discovery (MLD) for Ipv6", Network Working Group, Request for Comments: 2710, pp. 1-17, Oct. 1999.

* cited by examiner

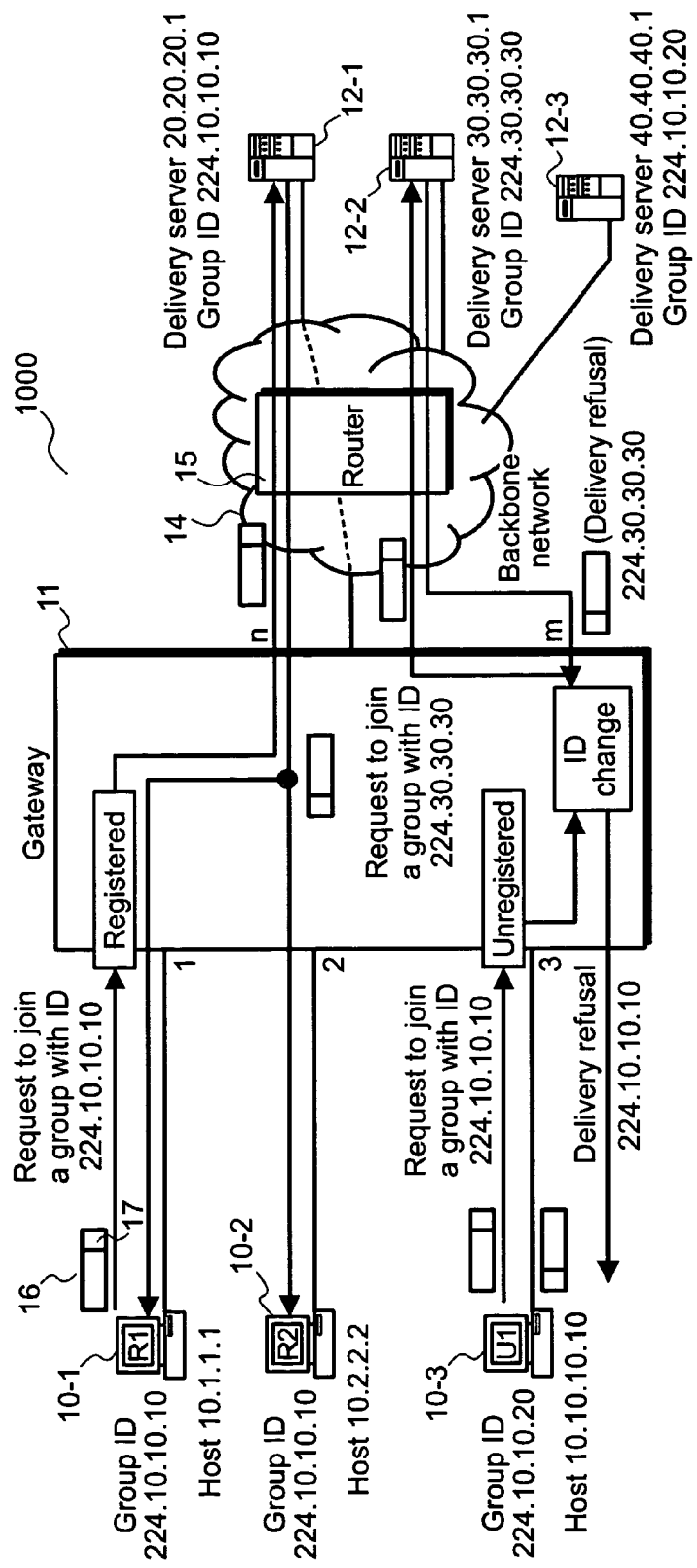
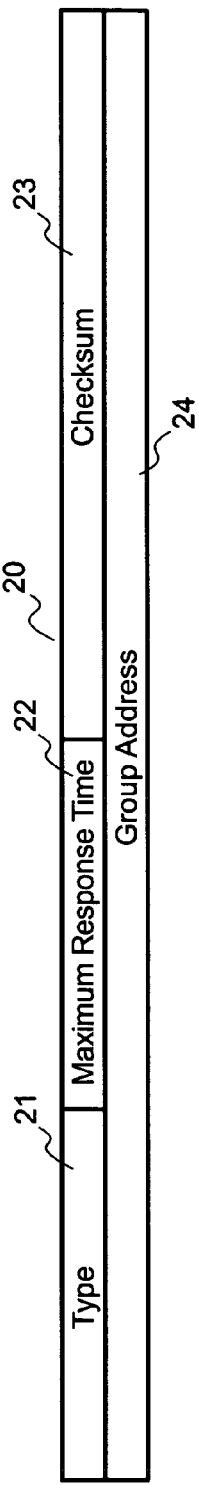
FIG.1
FIG.2

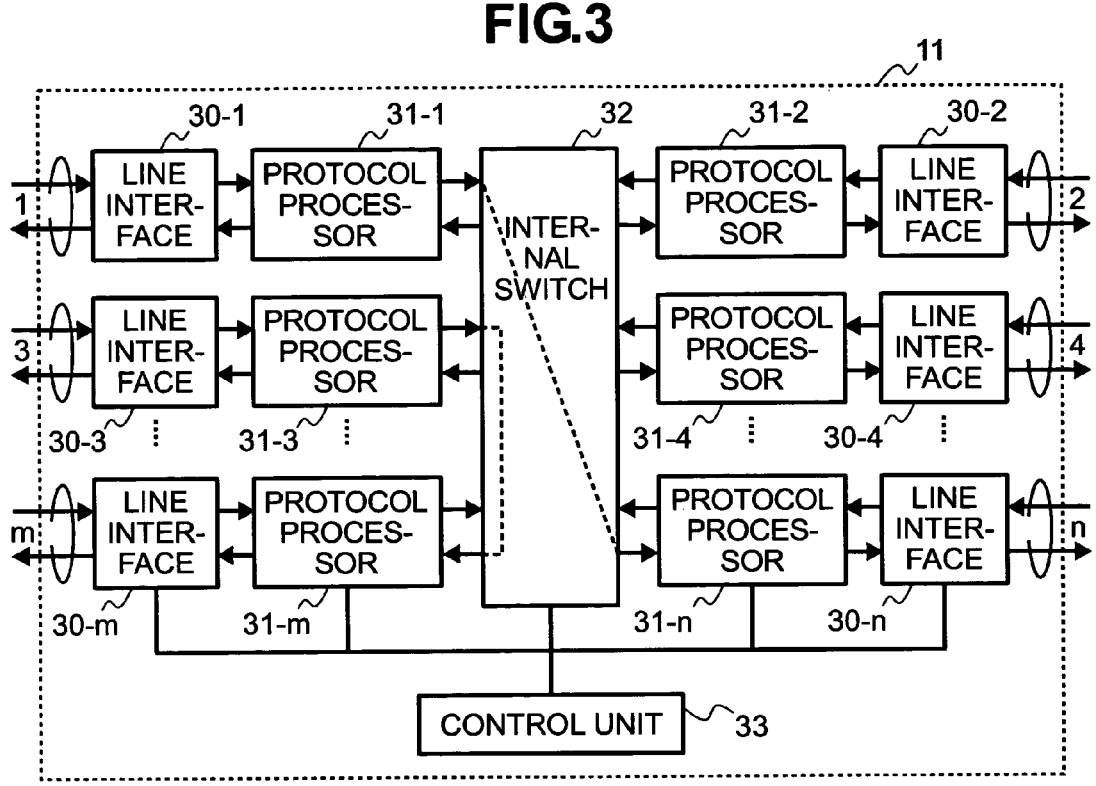
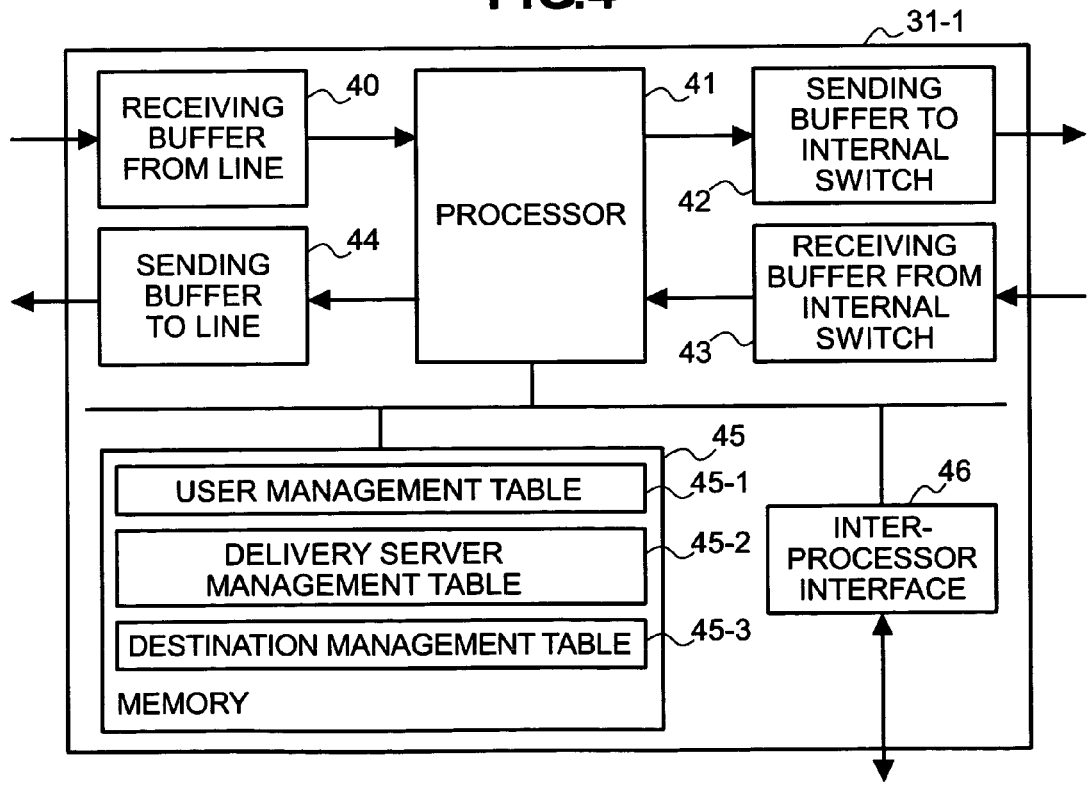

FIG.5

| Host IP Address | Port Number | Group ID |
|---|---|---|
| 10.1.1.1 | 1 | 224.10.10.10 |
| 10.2.2.2 | 2 | 224.10.10.10 |
| ... | | ... |
| ... | | ... |

FIG.6

| Group ID | Delivery Server IP Address | Group ID of Delivery Server for Unregistered Host | IP Address of Delivery Server for Unregistered Host |
|---|---|---|---|
| 224.10.10.10 | 20.20.20.1 | 224.30.30.30 | 30.30.30.1 |
| 224.10.10.20 | 20.20.20.2 | 224.50.50.50 | 30.30.30.2 |
| ... | ... | ... | ... |
| ... | ... | ... | ... |

FIG.7

| Group ID | Port Number for Registered Host | Port Number for Unregistered Host |
|---|---|---|
| 224.10.10.10 | 1,2 | 3 |
| 224.10.10.20 | NULL | NULL |
| ... | ... | ... |
| ... | ... | ... |

MULTICAST PACKET ROUTING ARRANGEMENTS FOR GROUP-MEMBERSHIP HANDLING

BACKGROUND OF THE INVENTION

The present invention relates to multicasting technology for delivering information, such as a data content.

Multicasting is a known communication technique that is effective for delivering the same information (such as content) to multiple (user) terminals. Multicasting is advantageous over unicasting, i.e., point-to-point transmission of information, because it reduces the load on a delivery server and reduces traffic. In multicasting, an Internet Group Membership Protocol (IGMP) may be used for IPv4 and a Multicast Listener Discovery (MLD) protocol may used as a protocol for IPv6. The IGMP is defined in the Request for Comments (RFC) 1112 and RFC 2236 documents, which are Internet standards laid open by the Internet Engineering Task Force (IETF). Likewise, the MLD protocol is defined in the RFC 2710 document.

The above-mentioned IGMP and MLD protocols may be used between hosts and packet routing devices (such as gateways and routers). In multicasting, for effective delivery of the same data to multiple hosts, these protocols are used to control host groups (multicast groups) configured for receiving multicast datagrams. The IGMP and MLD protocols are used when a host sends a request to join a multicast group (request for delivery of multicast data) and when a host sends a request to leave a multicast group (request to stop delivery of multicast data).

According to the above-described multicasting technique, for example, when a host wishes to join or leave a particular multicast group, it sends an appropriate IGMP or MLD message to a packet routing device. The packet routing device can determine all hosts (registered member hosts) belonging to each of the multicast groups under its management by IGMP or MLD. Therefore, the packet routing device can transmit multicast data efficiently to such member hosts by making as many copies of one multicast packet as the number of specified hosts and transmit the copies simultaneously to all of the hosts.

Meanwhile, it is possible that a user of an unregistered host may try to access a multicast group improperly. In this case, the unregistered host transmits, to a packet routing device, a request packet to join the multicast group. However, in the conventional system, the packet routing device rejects the request to join received from the unregistered host and just discards the received packet, thus sending no response to the unregistered host. As a result, the unregistered host cannot recognize why it cannot join the multicast group in response to its request. If a reply were to be sent to the unregistered host, then data delivery refusal messages would be sent to all hosts belonging to the multicast group (which is the object of the request to join the group).

Content delivery service providers may wish to provide a preview or digest of a data content to be delivered to unregistered hosts and also to solicit membership registration with a multicast group. However, packet routing devices having the above-described background arrangements have no way of sending responses exclusively to unregistered hosts, as described above.

BRIEF DESCRIPTION OF THE DRAWINGS

FIG. 1 is a diagram which shows an example of the architecture of a communication system in which an example of the packet routing apparatus according to the present invention may be used.

FIG. 2 is a diagram which shows an example of the format of an IGMP message header for use in the communication system of FIG. 1.

FIG. 3 is a block diagram showing an example of the configuration of a gateway according to the present invention.

FIG. 4 is a block diagram showing an example of the detailed configuration of the protocol processor 31-1.

FIG. 5 is a diagram which illustrates an example of the structure of the user management table 45-1.

FIG. 6 is a diagram which illustrates an example of the structure of the delivery server management table 45-2.

FIG. 7 is a diagram which illustrates an example of the structure of the destination table 45-3.

DETAILED DESCRIPTION

Figure 8:
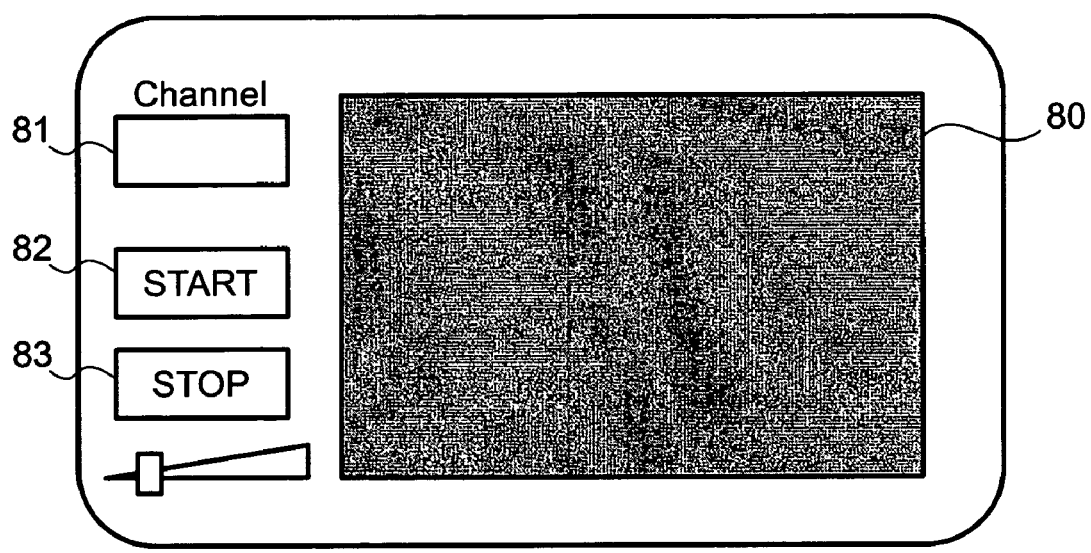
FIG. 8 is a diagram which illustrates an example of a display of each host.

Before beginning a detailed description of the subject matter of the present invention, mention of the following details is in order. When appropriate, like reference numerals and characters may be used to designate identical, corresponding or similar components in different drawings. Arrangements may be shown in block diagram form in order to avoid the possibility of obscuring the invention; and, also, in view of the fact that specifics with respect to implementation of such block diagram arrangements are highly dependent upon the platform within which the present invention is to be implemented, it is believed that such specifics should be well within the purview of one skilled in the art. In other instances, detailed descriptions of well-known methods and components are omitted so as not to obscure the description of the invention with unnecessary/excessive detail. Where specific details (e.g., circuits, flowcharts) are set forth in order to describe example embodiments of the invention, it should be apparent to one skilled in the art that the invention can be practiced without, or with variation of, these specific details.

Finally, it should be apparent that differing combinations of hard-wired circuitry and software instructions can be used to implement embodiments of the present invention, i.e., the present invention is not limited to any specific combination of hardware and software.

Various embodiments of the present invention will now be described hereinafter with reference to the drawings.

Embodiment 1

FIG. 1 shows an example of the architecture of a communication system 1 in which an example of the packet routing apparatus of the present invention may be used. The first embodiment, in which IGMP-based multicasting is performed, will now be discussed. The communication system 1000 is comprised of a plurality of hosts (e.g., users computers and/or communication terminals) (10-1, 10-2, 10-3), a packet routing apparatus (e.g., a gateway) 11 to which the hosts are connected, delivery servers (12-1, 12-2, 12-3), and a backbone network (communication network) (e.g., an IPv4 network) 14 to which the gateway and the delivery servers are connected. The network 14 includes, for example, a router 15, so that the hosts 10-1, 10-2, 10-3 receiving multicast data may be connected to any of the delivery servers 12-1, 12-2, 12-3 via the gateway 11 and the router 15.

The following assumptions are made to facilitate the present discussion. The users of the hosts have subscribed to an information delivery company for a channel that each user is authorized to receive, information of which is registered beforehand on the gateway 11. There are multicast groups corresponding to channel numbers. The hosts 10-1 (R1) and 10-2 (R2) are registered member hosts, which try to receive a subscription channel (join a multicast group). The host 10-3 (U1) is a host unregistered to this group, which tries to receive a non-subscription channel (join the group of the registered member hosts 10-1, 10-2).

Each host is assigned an IP address and a multicast group identifier (group ID) (multicast address). A delivery server exists for each group (channel) and is assigned an IP address and a group ID. In this embodiment, the hosts 10-1 and 10-2 and the delivery server 12-1 belong to the same group (multicast group 1), and they are assigned a group ID 224.10.10.10. Likewise, the host 10-3 and the delivery server 12-3 belong to the same group (multicast group 2), and they are assigned a distinguishing group ID 224.10.10.20.

As will be described in more detail later, the delivery server 12-2 communicates with an unregistered host (delivery server for unregistered host) and operates as follows. For example, when the host 10-3 (unregistered to the multicast group 1) issues a request to join the multicast group 1 having the group ID 224.10.10.10, this server 12-2 sends a delivery refusal message to the unregistered host 10-3. This server 12-2 may also transmit a preview or digest of the content to be delivered to the unregistered host 10-3 to solicit membership registration to the group having the group ID 224.10.10.10. This server may be owned by the same service provider that owns the delivery server 12-1. This delivery server 12-2 may, for example, be assigned a group ID 224.30.30.30.

In continuing discussion of the embodiment, the gateway 11 may have a group ID (address) changing function. Upon receiving a join request message from the unregistered host 10-3, the gateway may change the group ID 224.10.10.10 included in that message to the group ID 224.30.30.30 and output the message including the changed group ID. Thereby (as a result of the change), the join request message is forwarded (i.e., diverted) to the delivery server 12-2.

In this embodiment, to the ports which are assigned numbers 1, 2, 3 of the gateway 11, the hosts 10-1, 10-2, 10-3 are connected, respectively. The ports designated m, n of the gateway 11 are used for connections to the network. In the communication system 1000, the above-mentioned messages are transmitted and received in the form of a packet 16 with a header 17. Therefore, a port number may be used for the gateway 11 to identify a host that transmits and receives a packet 16 to/from the gateway.

FIG. 2 shows an example of the format of an IGMP message header 20 for use in the communication system 1000. As described in RFC 1112 and RFC 2236, the IGMP message header 20 may include the following fields: Type 21, Maximum Response Time 22, Checksum 23, and Group Address 24.

The Type field 21 specifies the type of the IGMP message. This field contains one of the values specific for Membership Query (to join a multicast group), Membership Report (a multicast group report), and Leave Group (to leave a multicast group), by which the type of the IGMP message can be identified. In the case of the above-mentioned join request message, the Type field 21 contains a value for Membership Query (to join a multicast group).

The Maximum Response Time field 22 specifies the maximum delay time before sending a responding IGMP message. The Group Address field 24 contains a multicast group ID for IPv4.

FIG. 3 is a block diagram showing an example of the configuration of the gateway 11 according to the present invention. The gateway 11 is comprised of, but not limited to, a plurality of line interfaces 30-*i* (where i is a counting number except for 0), a plurality of protocol processors 31-*i*, an internal switch 32, and a control unit 33 which exerts overall control of these elements.

The line interfaces 30-*i* include interfaces with the hosts 10-*i* and interfaces with the network; the former interfaces are for packet transmission/reception to/from the hosts 10-*i*, and the later interfaces are for packet transmission/reception onto/from the network 14. In this embodiment, one host is connected to one line interface. Therefore, since one port exists in one line interface, one port number is assigned to each line interface.

A protocol processor 31-*i* may have an arrangement, when receiving a request to join or leave a multicast group from a host unregistered to that group, for sending a response exclusively to the unregistered host. Also, the protocol processor 31-*i* may be provided with an arrangement for creating as many copies of a packet addressed to a multicast group as the number of member hosts in that group and a means for routing these copy packets (multicast packets) or similar processing.

The internal switch 32 outputs a packet received from a protocol processor 31-*i* to any of the plurality of protocol processors 31-*i*, based on the header information in the packet.

FIG. 4 is a block diagram showing an example of the detailed configuration of the protocol processor 31-1. The protocol processor 31-1 may include a receiving buffer from line 40 for receiving packets from a line interface 30-*i*, a processor 41 which executes protocol processing, a sending buffer to internal switch 42 for sending packets to the internal switch 32, a receiving buffer from internal switch 43 for receiving packets from the internal switch 32, a sending buffer to line 44 for sending packets to the line interface 30-*i*, a memory (storage) 45 for storing tables (a user management table 45-1, a delivery server management table 45-2, and a destination table 45-3), and an inter-processor interface 46 operating as an interface with the control unit 33.

The processor 41 reads a packet stored in the receiving buffer from line 40, extracts a message part from it, and executes the above-described protocol processing. After reassembling the message part into a packet, it outputs this packet to the sending buffer to internal switch 42. The processor 41 performs similar processing for a packet received from the internal switch 32.

FIG. 5 illustrates an example of the structure of the user management table 45-1. In the user management table 45-1, the following may be stored for separate rows 500-1 (pertaining to each host): the IP address 50 of each host (10-1, . . . 10-3), the port number 52 and the group ID 51 associated with the host. In this embodiment, the protocol processor 31-*i* provided in the gateway 11 uses this table to determine whether the source host of a received packet is registered, based on the contents (IP address, group ID) of the received packet and the contents of this user management table 45-1.

FIG. 6 illustrates an example of the structure of the delivery server management table 45-2. In the delivery server management table 45-2, the following may be stored for separate rows 600-1 (pertaining to each group): each group ID 60, the delivery server IP address 61 associated with the group ID, the group ID 62 of a delivery server that transmits information to a host unregistered to a multicast group, in response to a request to join that group issued from the unregistered host, and the IP address 63 of the delivery server (for unregistered host) associated with the group ID.

In this embodiment, when the gateway 11 receives a join request message from the unregistered host, the protocol processor 31-*i* provided in the gateway 11 changes the group ID that is the object of the join request included in the received packet to the group ID of the delivery server for an unregistered host, based on the contents (group ID) of the received packet and the contents of the delivery server management table 45-2.

FIG. 7 illustrates an example of the structure of the destination table 45-3. In the destination table 45-3, the following may be stored for separate rows 700-1 (pertaining to each group): each group ID 70 and port numbers 71, 72 for registered hosts having the group ID and for unregistered hosts, respectively, by which a packet output destination host is determined. In this embodiment, the protocol processor 31-*i* provided in the gateway 11 determines the output destination of a received packet, based on the contents (group ID) of a received packet and the contents of the destination table 45-3.

FIG. 8 illustrates an example of a display of each host (10-1 to 10-3). The host's display consists mainly of a display screen 80 on which information (content) from a delivery server is displayed, and it may be equipped with a channel input field 81 for the entry of a channel providing information that the user wants to get, a start button 82 by which the user issues a request for delivery of information (join group request), and a stop button 83 by which the user issues a request to stop delivery of information (leave group request).

The screen illustrated in FIG. 8 is shown as an example of the state where no information is presently received from a delivery server. For example, when the user enters a subscription channel for which the user has subscribed to an information delivery company in the channel input field 81 and press the start button 82, a join request message packet is transmitted to the gateway 11 from which the message is transmitted over the network 14 to the delivery server.

From the delivery server, information to be provided on the channel is transmitted over the network 14 to the gateway 11, from which the information is transmitted to the host and displayed on the display screen 80. If the host is receiving information provided on another subscription channel, that information is displayed on the display screen 80. In this state, when the user wants to view information provided on yet another channel, the user can switch the display to another channel by entering that channel in the channel input field 81.

Figure 9:
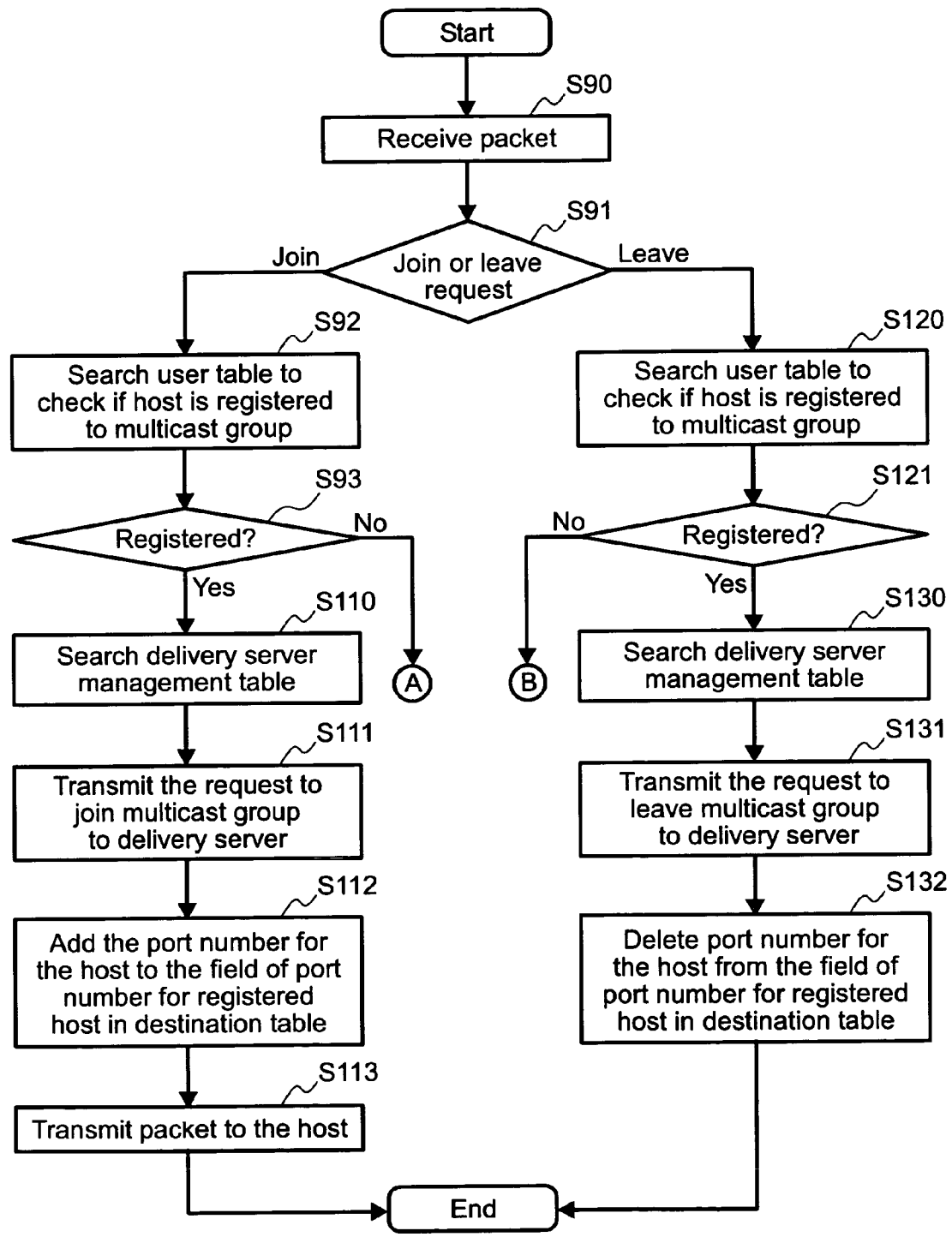
FIG. 9 is a flowchart illustrating an example of how the gateway according to the present invention may operate.
Figure 10:
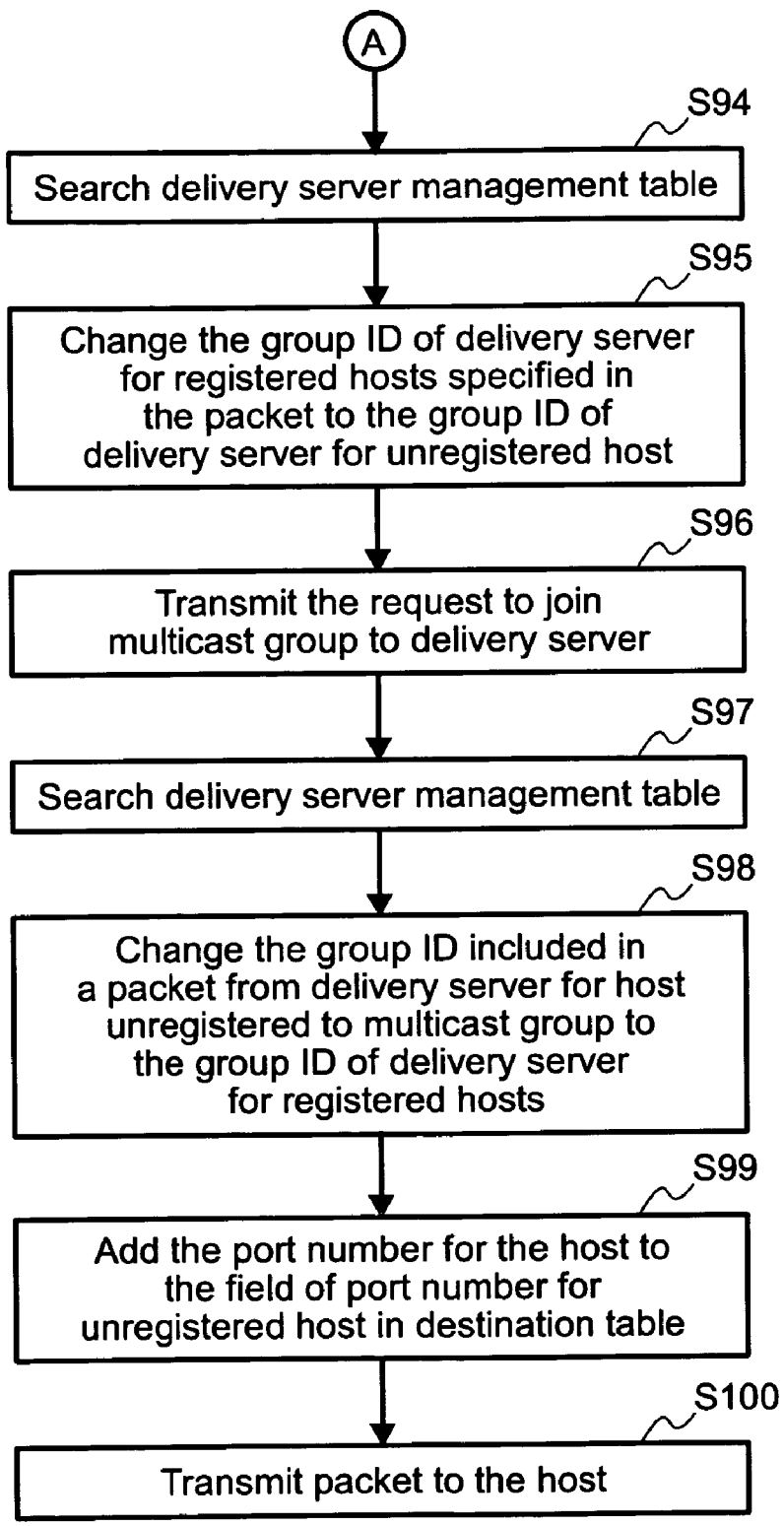
FIG. 10 is a flowchart illustrating an example of how the gateway according to the present invention may operate to process a join group request.
Figure 11:
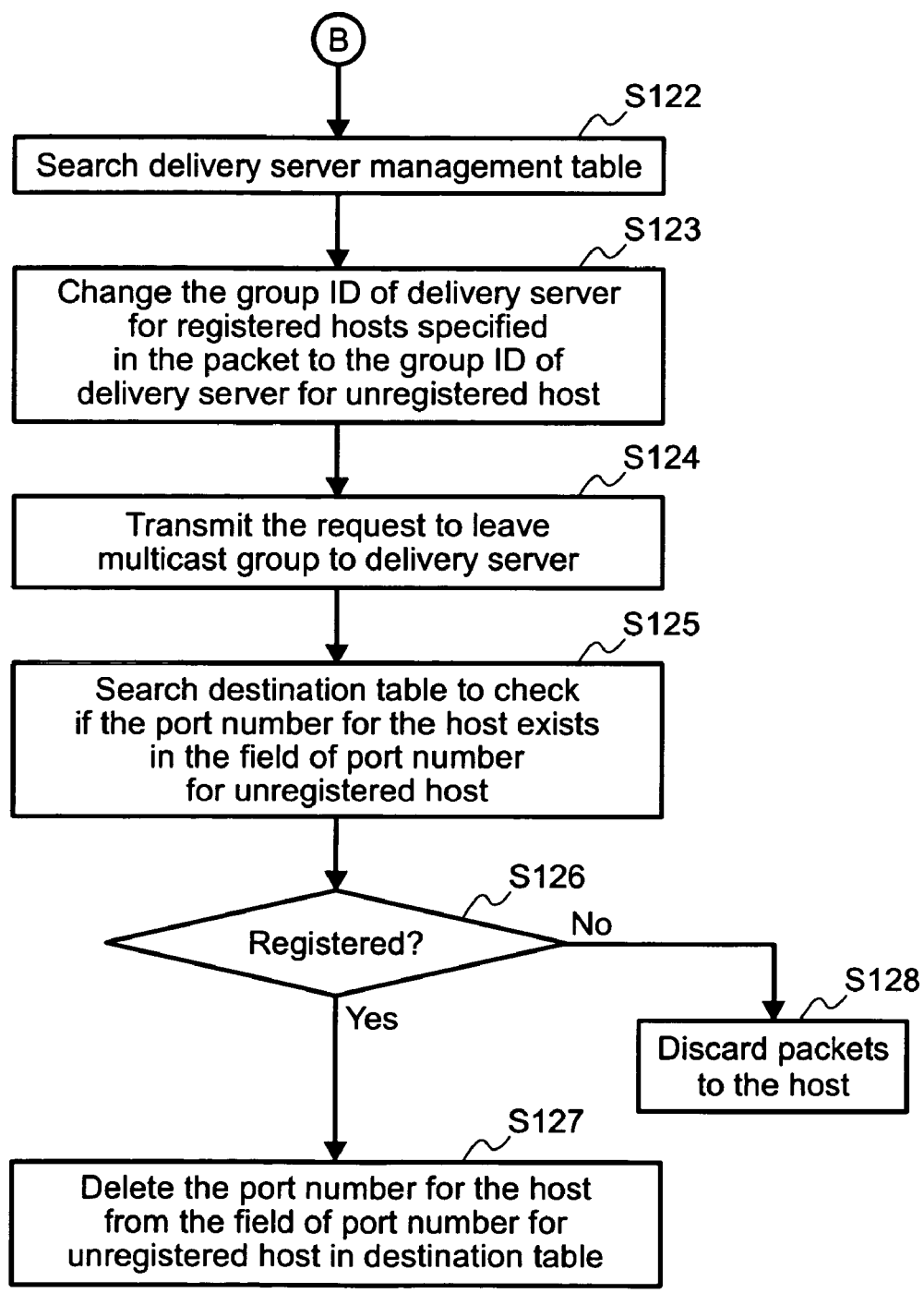
FIG. 11 is a flowchart illustrating an example of how the example gateway 11 according to the present invention may operate to process a leave group request.
Figure 12:
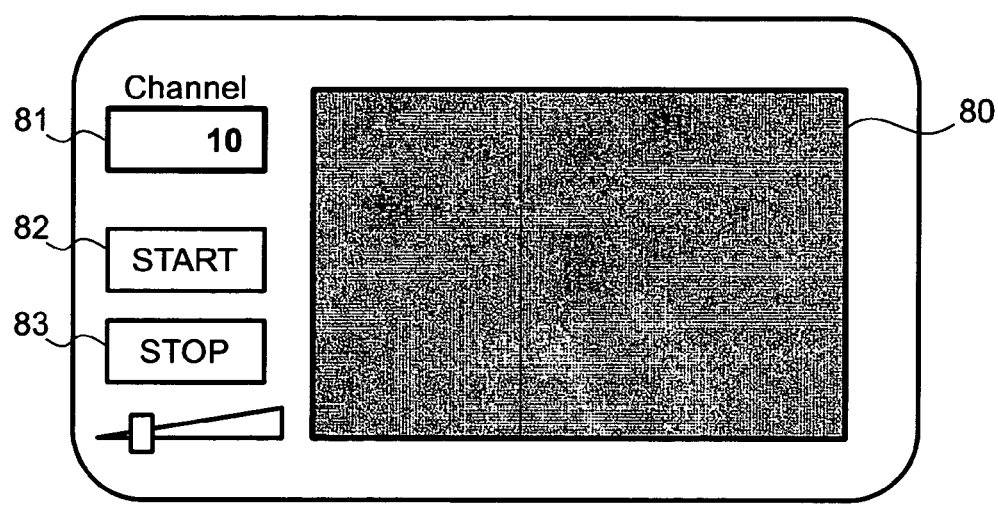
FIG. 12 is a diagram which illustrates an example of a host's display screen with a channel input field 81 filled with a channel number.

FIGS. 9 through 11 are flowcharts illustrating examples of how the gateway 11 according to the present invention may operate. Each flow will be described individually in the following.

(1) Request to Join a Group (Delivery Server for Registered Hosts)

First, in a case where the host 10-1 (R1) with the group ID 224.10.10.10 sends a join request to the delivery server 12-1 with the group ID 224.10.10.10, how the gateway 11 (FIG. 1) operates is described. For example, assume that the user of the host 10-1 wants to receive a channel 10 of the channels for which the user subscribed to the owner (information delivery company) of the delivery server 12-1. At this time, if the host receives no information from the delivery server 12-1, nothing is displayed on the host's display screen (FIG. 8). In this state, when the user enters the channel member 10 in the channel input field 81 and presses the start button 82, a join request message packet 16 is transmitted from the host 10-1 to the gateway 11 (FIG. 1).

When the line interface 30-1 provided in the gateway 11 receives the join request message packet 16 from the host 10-1 (flow operation S90), it outputs the received packet to the protocol processor 31-1. The packet is temporarily stored in the receiving buffer from line 40 provided in the protocol processor 31-1. The processor 41 reads the packet stored in the receiving buffer from line 40, and it judges that the received packet is for a join group request from the value specified in the Type 21 field (FIG. 2) of the join request message contained in the packet (S91). Then, the processor 41 searches the user management table 45-1 for the group ID 224.10.10.10 specified in the Group Address field 24 of the join request message and the IP address 10.1.1.1 of the host 10-1 (S92), and it determines whether the group ID and IP address are registered (S93). Here, since the group ID 224.10.10.10 and the IP address 10.11.1 are registered in the user management table 45-1 (500-1, FIG. 5), the processor 41 determines that the host 10-1 is registered for membership to the group with the group ID 224.10.10.10. Next, the processor 41 searches the delivery server management table 45-2 for the above-stated group ID (S110) and outputs a packet containing the join request message and the IP address 20.20.20.1 of the delivery server 12-1 obtained by the search to the sending buffer to internal switch 42. After the packet is output to the internal switch 32, the internal switch 32 outputs it to any of the plurality of protocol processors (e.g., 31-*n* in FIG. 3), based on the packet header. Through the line interface (e.g., 30-*n*) connected to the protocol processor, the packet is transmitted to the delivery server 12-1 (S11) (FIG. 1).

When the delivery server 12-1 receives the join group request packet from the gateway 11, it transmits a packet containing information provided on the channel 10 to the router 15, which then travels to the gateway 11.

The line interface 30-*n* provided in the gateway 11 outputs the packet received from the delivery server 12-1 to the protocol processor 31-*n*. The processor 41 provided in the protocol processor 31-*n* reads the packet from the receiving buffer from line 40, refers to the user management table 45-1 and determines that port number 1 is used for the packet output destination (host 10-1), adds that port number to the port number field for registered host 72 in the destination table 45-3 (S112), and outputs the packet to the sending buffer to internal switch 42. The packet is output to the line interface 30-1 in the same manner as indicated above and it is transmitted to the host 10-1 (S113) (FIG. 1). Because the host 10-2 is also assigned the same group ID as the group ID of the host 10-1, the packet is transmitted to the host 10-2 as well.

Figure 13:
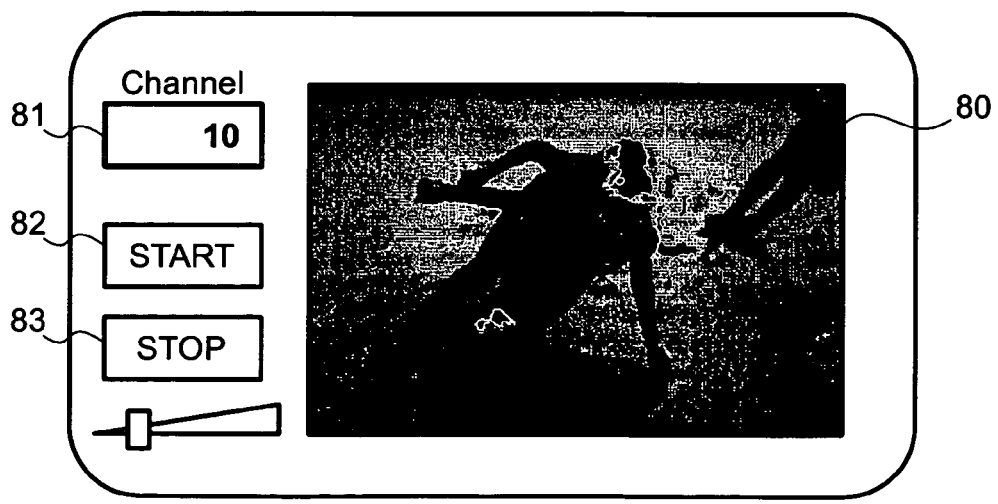
FIG. 13 is a diagram which illustrates an example of a host's display screen 80 on which information, such as video, is displayed.

The host 10-1 displays information (such as video) contained in the received packet on its display screen 80 (FIG. 13). Then, the user of the host can view the video or receive other information that the user wants to receive.

(2) Request to Join a Group (Delivery Server for Unregistered Host)

Next, in a case where the host 10-3 (U3) with the group ID 224.10.10.20 sends a join request destined for the delivery server 12-1 having the group ID 224.10.10.10, how the gateway 11 operates will be described. For example, assume that the user of the host 10-3 has now improperly entered a non-subscription channel ((e.g., channel 10) for which the user did not subscribe to the owner (information delivery company) of the delivery server 12-1) in the channel input field shown in FIG. 8 (FIG. 14) and has pressed the start button 82.

In this case, a join request message packet is transmitted from the host 10-3 to the gateway 11 (FIG. 1). To process the packet, the flow operations S90, S91, S92, and S93 (FIG. 9) are performed in the same manner as described in the above item (1). However, since the group ID 224.10.10.10 and the IP address 10.10.10.10 included in the packet transmitted from the host 10-3 are not registered in the user management table 45-1 (FIG. 5), the processor 41 searches (FIG. 10) the delivery server management table 45-2 for the group ID 224.10.10.10 (S94) and obtains the group ID 224.30.30.30 and IP address 30.30.30.1 of the delivery server 12-2 for the host 10-3 (unregistered host).

Next, the processor 41 changes the value 224.10.10.10 contained in the Group Address field 24 of the join request message to the value 224.30.30.30 (S95). Then, the processor 41 outputs a packet containing the join request message in which the group ID was changed and the IP address 30.30.30.1 of the delivery server 12-2 to the sending buffer to internal switch 32. After the packet is output to the internal switch 32, the internal switch 32 outputs it to any of the plurality of protocol processors (e.g., 31-*m* in FIG. 3), based on the packet header. Through the line interface (e.g., 30-*m*) connected to the protocol processor, the packet is transmitted to the delivery server 12-2 (S96) (FIG. 1).

When the delivery server 12-2 receives the above packet from the gateway 11, it transmits a packet containing information indicating delivery refusal to the router 15, which then travels to the gateway 11.

The line interface 30-*m* provided in the gateway 11 outputs the packet received from the delivery server 12-2 to the protocol processor 31-*m*. The processor 41 provided in the protocol processor 31-*m* reads the packet from the receiving buffer from line 40, searches the delivery server management table 45-2 for the group ID 224.30.30.30 of the delivery server 12-2 included in the packet (S97), and obtains the group ID 224.10.10.10 of the group that host 10-3 requests joining. Next, the processor 41 changes the value 224.30.30.30 contained in the Group Address field 24 of the join request message to a value 224.10.10.10 (S98). Then, the processor 41 refers to the user management table 45-1 and determines that port number 3 is used for the packet output destination (host 10-3), adds that port number to the port number field 71 in the destination table 45-3 (S99) (700-1, FIG. 7), and outputs the packet to the sending buffer to internal switch 42. The packet is output to the line interface 30-3 in the same manner as described above, and it is transmitted to the host 10-3 (S100) (FIG. 1).

Figure 14:
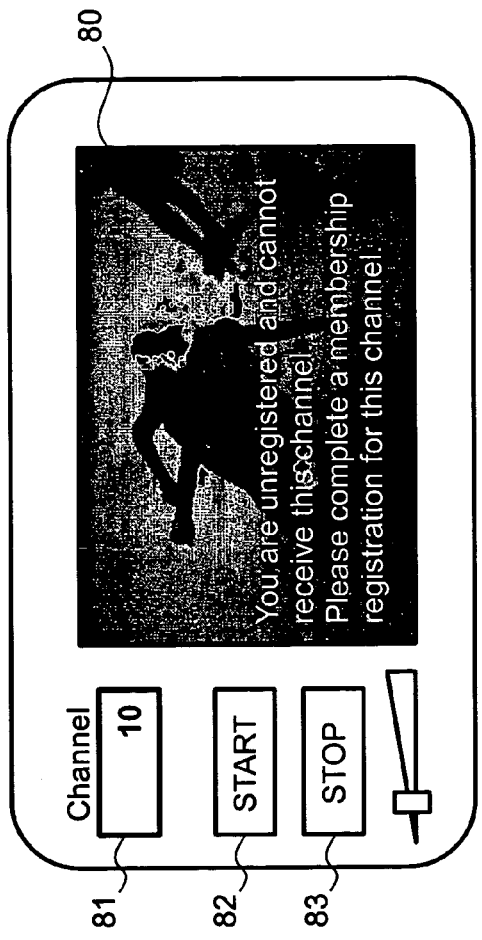
FIG. 14 is a diagram which illustrates an example of an unregistered host's display screen on which an example of information indicating delivery refusal is displayed.

The host 10-3 displays information indicating delivery refusal contained in the received packet on its display screen 80 (FIG. 14). In this embodiment, a message, for example, "You are unregistered and cannot receive this channel. Please complete a membership registration for this channel" is displayed. On the screen illustrated in FIG. 14, a digest or preview of the content provided on the channel 10 may be displayed. Then, the user of the host 10-3 can perceive that he or she made an erroneous input of a non-subscription channel. Alternatively, the content delivery service provider can simply solicit an unregistered user to make a membership registration for a channel.

(3) Request to Leave a Group (Delivery Server for Registered Hosts)

The following discussion relates to a case in which, when the user of the host 10-1 is receiving information provided on the channel 10 (in consequence of the operation described in the above item (1)), as illustrated in FIG. 13, the user issues a request to stop delivery of the information (leave request). When the user presses the stop button 83 of the host's display screen, a packet containing a leave request message is transmitted from the host 10-1 to the gateway 11.

When the line interface 30-1 provided in the gateway 11 receives the leave request packet from the host 10-1 (flow operation S90), it outputs the received packet to the protocol processor 31-1. The packet is temporarily stored in the receiving buffer from line 40 provided in the protocol processor 31-1. The processor 41 reads the packet stored in the receiving buffer from line 40 and judges that the received packet is for a leave group request on the basis of the value specified in the Type field 21 (FIG. 2) of the leave request message contained in the packet (S91; FIG. 9).

Then, the processor 41 searches the user management table 45-1 for the group ID 224.10.10.10 specified in the Group Address field 24 of the leave request message and the IP address 10.1.1.1 of the host 10-1 (S120; FIG. 9) and determines whether these group ID and IP address are registered (S121). Here, since the group ID 224.10.10.10 and the IP address 10.1.1.1 are registered in the user management table 45-1 (500-1, FIG. 5), the processor 41 determines that the host 10-1 is registered for a membership to the group with the group ID 224.10.10.10.

Next, the processor 41 searches the delivery server management table 45-2 for the above group ID (S130) and outputs a packet containing the above leave request message and the IP address 20.20.20.1 of the delivery server 12-1, which has been obtained during the search, to the sending buffer to internal switch 42. After the packet is output to the internal switch 32, the internal switch 32 outputs it to any of the plurality of protocol processors (e.g., 31-*n* in FIG. 3), based on the packet header.

Through the line interface (e.g., 30-*n*) connected to the protocol processor, the packet is transmitted to the delivery server 12-1 (S131). When the delivery server 12-1 receives the leave group request packet from the gateway 11, it stops the delivery of packets containing information provided for the channel 10.

The processor 41 provided in the protocol processor 31-1 deletes the port number 1 for connection to the host 10-1 that issued the leave request from the field of the port number for registered host 71 in the destination table 45-3 (S132). Then, because all packet transmission to the host 10-1 stops, the user of the host 10-1 no longer receives information provided on the channel 10

(4) Request to Leave a Group (Delivery Server for Unregistered Host)

The following discussion is directed to a case where, when the user of the host 10-3 is receiving a digest of the content distributed on the channel 10 (in consequence of the operation described in the above item (2)), the user issues a request to stop the delivery of the digest (leave request). When the user presses the stop button 83 of the host's display screen, a packet containing a leave request message is transmitted from the host 10-3 to the gateway 11. In this case, the flow operations S90, S91, S120, and S121 (FIG. 9) are performed in the same manner as described in the above item (3). However, since the group ID 224.10.10.10 and the IP address 10.10.10.10 included in the packet transmitted from the host 10-3 are not registered in the user management table 45-1 (FIG. 5), the processor 41 searches the delivery server management table 45-2 for the group ID 224.10.10.10 (S122; FIG. 11) and obtains the group ID 224.30.30.30 and IP address 30.30.30.1 of the delivery server 12-2 for the host 10-3 (unregistered host).

Next, the processor 41 changes the value 224.10.10.10 contained in the Group Address field 24 of the leave request message to the value 224.30.30.30 (S123). Then, the processor 41 outputs a packet containing the leave request message in which the group ID was changed and the IP address 30.30.30.1 of the delivery server 12-2 to the sending buffer to internal switch 42. After the packet is output to the internal switch 32, the internal switch 32 outputs it to any of the plurality of protocol processors (e.g., 31-*m* in FIG. 3), based on the packet header. Through the line interface (e.g., 30-*m*) connected to the protocol processor, the packet is transmitted to the delivery server 12-2 (S124).

When the delivery server 12-2 receives the above packet from the gateway 11, it stops the delivery of packets to that host, for example, a packet containing information indicating delivery refusal.

The processor 41 provided in the protocol processor 31-2 searches the destination table for the port number 3 to which the host 10-3 is connected (S125) and determines whether the port number 3 is registered in the destination table 45-3 (S126). If it is registered, the processor deletes that port number from the port number field 71 in the destination table 45-3 (S127). If the port number 3 is not registered, as determined by decision flow operation S126, packets addressed to the host 10-3 that have remained in the receiving buffer from line 40 and the like are discarded (S128).

Embodiment 2

While the above description of the Embodiment 1 assumes that IGMP-based multicasting is performed in the system, the present invention can also be applied to other types of arrangements, e.g., a MLD-based multicasting system.

Figure 15:
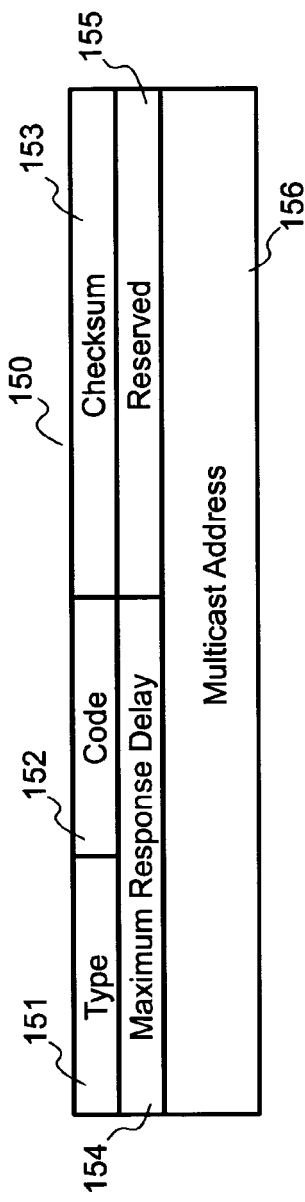
FIG. 15 is a diagram which shows an example of the format of an MLD message header 150 for use in the communication system in question.

FIG. 15 shows an example of the format of a MLD message header 150. As described in RFC 2710, the MLD message header 150 may include the following fields: Type 151, Code 152, Checksum 153, Maximum Response Delay 154, Reserved 155, and Multicast Address 156.

The Type 151 field specifies the type of the MLD message, for example, one of the following: Multicast Listener Query (multicast group query), Multicast Listener Report (multicast group report), and Multicast Listener Done (to leave a multicast group).

The Maximum Response Delay field specifies the maximum delay time before sending a responding MLD message. The Multicast Address field contains a multicast group address for IPv6.

Therefore, in Embodiment 2, the network 14 may be an IPv6 network, and MLD messages illustrated in FIG. 15 are used in the communication system 1000. This is one difference from Embodiment 1. Upon receiving a MLD message packet from a host, the gateway 11 may perform operations in the same manner as in Embodiment 1.

Embodiment 3

In the foregoing embodiments 1 and 2, when a host leaves a group, the gateway receives a leave request message packet from the host and performs operations to process the leave request. However, it is possible to make a host leave a group without receiving a leave request message packet from the host. In the flowchart of FIG. 10, illustrating the procedure for joining a group, for instance, after the elapse of a given time period after the gateway 11 completes the flow operation 100, the gateway 11 may generate a leave group request, execute the procedure for leaving a group, as illustrated in FIG. 11, skip the group ID changing flow operation, and stop information delivery to the host.

Embodiment 4

In the foregoing embodiments 1, 2, and 3, the system includes the delivery server 12-2 for sending a message of delivery refusal or the like to an unregistered host. However, the function of the delivery server 12-2 may be integrated into the gateway 11. In this case, the gateway 11 dispenses with the ID changing means.

Embodiment 5

Although the description of the foregoing embodiments 1, 2, 3, and 4 assumes that one line interface has one port, one interface may have a plurality of ports. Even in this case, the gateway 11 may operate in the same manner as in the foregoing embodiments.

Embodiment 6

Although, in the foregoing embodiments 1, 2, 3, 4, and 5, a join request message packet is routed via the internal switch 32, the routing apparatus may be configured without passing packets across the internal switch 32.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: computing machines, non-computing machines, communication machines, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). The term "machine-readable medium" should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other forms of propagated signals (e.g., carrier waves, infrared signals, digital signals); etc.

Method embodiments may be emulated as apparatus embodiments (e.g., as a physical apparatus constructed in a manner effecting the method); apparatus embodiments may be emulated as method embodiments.

In conclusion, reference in the specification to "one embodiment", "an embodiment", "preferred embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative order, simultaneously, etc.

This concludes the description of the embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. A network apparatus for routing multicast packets, comprising:
    an interface connected with a network for receiving or transmitting multicast packets:
    a processor for changing a first group ID of a first multicast group included in a packet received by the interface, with a second group ID of a second multicast group, for any non-first-group-member multicast packets invalidly directed towards the first multicast group by a non-first-group member,
    wherein the second multicast group corresponds to a multicast group predetermined to handle non-first-group-member multicast packets invalidly directed towards the first multicast group,
    wherein the second group ID is an ID of a server configured to communicate with the non-first-group member, and
    wherein the interface receives specific packets from the server in case that the processor changes the first ID with the second ID, and forwards the specific packets to the non-first-group member.

2. A network apparatus according to claim 1, comprising:
    a memory storing relationships between IP addresses and group IDs, and relationship between the first group ID and the second group ID:
    wherein the processor refers to the memory to see if an IP address included in the packet is related to the first group ID, and in the case of not having being related, changes the first group ID with second group ID by referring to the relationships of group IDs in the memory.

3. A network apparatus according to claim 2:
    wherein the processor changes the IP address included in the packet with another IP address related to the second group ID, as indicated by the relationships in the memory.

4. A network apparatus according to claim 1:
    wherein the packet requests to join the first multicast group identified by the first group ID.

5. A network apparatus for routing multicast packets, comprising:
    an interface connected with a network for receiving or transmitting multicast packets:
    a processor for determining when a packet received by the interface is not send from an apparatus belonging to a multicast group distinguished by a group ID stored in the multicast packet, and for changing a first group ID of a first multicast group included in the packet received by the interface, with a second group ID of a second multicast group for provoking a message to notice the apparatus that the packet is not delivered,
    wherein the second group ID is an ID of a server configured to communicate with the apparatus, and
    wherein the interface receives specific packets regarding the message from the server in case that the processor changes the first ID with the second ID, and forwards the specific packets to the apparatus.

6. A network apparatus according to claim 5, comprising:
    a memory storing relationships between IP addresses and group IDs:
    wherein the processor refers to the memory to see if an IP address included in the packet is related to the group ID, and in a case of not being related, deciding to make the message.

7. A network apparatus according claim 6:
    wherein the packet requests to join the multicast group identified by the first multicast group.

8. A group-membership monitoring arrangement to receive or transmit multicast packets which contain user-designating information and group-designating information,
    and to monitor each multicast packet to determine whether a user indicated by the user-designating information is a valid member of a group indicated by the group-designating information,
    and upon determination as an invalid member, to perform rerouting of the multicast packet to a different destination, and returning, to the user, a rejection multicast packet containing an indication of rejection,
    wherein the different destination is an address of a server configured to communicate with the invalid member.

9. A group-membership monitoring arrangement according to claim 8 comprising a storage to store an information that shows members of the group indicated by the group-designating information,
    and to refer to the information stored in the storage, to determine whether the user is an invalid member.

10. A group-membership monitoring arrangement according to claim 9, wherein the storage stores a destination address related to the group-designating information to reroute the multicast packet.

11. A network apparatus according to claim 1, wherein the specific packets includes an information indicating delivery refusal to be presented to the non-first-group member.

12. A network apparatus according to claim 5, wherein the specific packets includes an information indicating delivery refusal to be presented to the non-first-group member.

* * * * *